United States Patent
Schädlich et al.

(10) Patent No.: US 11,519,483 B2
(45) Date of Patent: Dec. 6, 2022

(54) BALL SCREW AND ASSEMBLY METHOD

(71) Applicant: SFS intec Holding AG, Heerbrugg (CH)

(72) Inventors: André Schädlich, Salez (CH); Daniel Sinz, Kennelbach (AT)

(73) Assignee: SFS intec Holding AG, Heerbrugg (CH)

( * ) Notice: Subject to any disclaimer, the term of this patent is extended or adjusted under 35 U.S.C. 154(b) by 0 days.

(21) Appl. No.: 17/212,071

(22) Filed: Mar. 25, 2021

(65) Prior Publication Data

US 2021/0301910 A1    Sep. 30, 2021

(30) Foreign Application Priority Data

Mar. 25, 2020   (EP) ..................................... 20165651

(51) Int. Cl.
*F16H 25/22*        (2006.01)
*F16H 25/24*        (2006.01)

(52) U.S. Cl.
CPC . *F16H 25/2223* (2013.01); *F16H 2025/2481* (2013.01)

(58) Field of Classification Search
CPC ............. F16H 25/2214; F16H 25/2219; F16H 25/2223; F16H 25/2204; F16H 25/22; F16H 2025/2481
See application file for complete search history.

(56) References Cited

U.S. PATENT DOCUMENTS

| | | | | |
|---|---|---|---|---|
| 2,855,792 | A * | 10/1958 | Gates | F16H 25/2214 |
| | | | | 74/424.87 |
| 9,062,748 | B1 * | 6/2015 | Guglietti | F16H 25/2214 |
| 9,897,181 | B1 * | 2/2018 | Lin | F16H 25/2214 |
| 2010/0242653 | A1 | 9/2010 | Adler et al. | |
| 2013/0199324 | A1 * | 8/2013 | Piltz | F16H 25/2223 |
| | | | | 74/424.86 |
| 2013/0298710 | A1 * | 11/2013 | Kreutzer | F16H 25/2214 |
| | | | | 74/424.86 |

(Continued)

FOREIGN PATENT DOCUMENTS

| | | |
|---|---|---|
| DE | 102008025349 | 12/2009 |
| DE | 102010034488 | 2/2012 |

(Continued)

*Primary Examiner* — Daniel D Yabut
(74) *Attorney, Agent, or Firm* — Volpe Koenig (57) ABSTRACT

A diverter for a ball return of a ball screw configured for lifting in and lifting out balls from a ball channel between the spindle nut and the threaded spindle. The diverter is configured in one piece and has 3 functional units, specifically a positioning element, a deflection element having a spade-like lifting-out region and a diverting surface for balls out of or into the ball channel. All surfaces of the diverter that are provided for guidance of balls are configured as circumferentially open grooves (not closed in the manner of a tunnel). A method for assembling such a ball return includes providing two single-piece, structurally identical diverters; providing a pre-assembled module with a spindle nut and a threaded spindle, the spindle nut having two inwardly fitted apertures; inserting the diverters into the apertures; introducing balls; and securing the ball return by attaching a covering sleeve to the spindle nut.

10 Claims, 6 Drawing Sheets

(56) References Cited

U.S. PATENT DOCUMENTS

2015/0284020 A1\* 10/2015 Asakura ............... B62D 5/0448
180/444

FOREIGN PATENT DOCUMENTS

| | | | | |
|---|---|---|---|---|
| DE | 102013207745 | 10/2014 | | |
| DE | 102016214964 | 1/2018 | | |
| EP | 2221506 | 8/2010 | | |
| EP | 2514999 | 10/2012 | | |
| EP | 2515000 A1 \* | 10/2012 | ......... | F16H 25/2214 |
| EP | 3202640 A1 \* | 8/2017 | ............... | B62D 3/06 |
| WO | WO-2013112597 A1 \* | 8/2013 | ......... | F16H 25/2214 |
| WO | 2014184154 | 11/2014 | | |

\* cited by examiner

BALL SCREW AND ASSEMBLY METHOD

INCORPORATION BY REFERENCE

The following documents are incorporated herein by reference as if fully set forth: European Patent Application No. EP20165651.9, filed Mar. 25, 2020.

TECHNICAL FIELD

The present invention is concerned with a ball screw, in particular the improved and simplified construction of the ball diverter or ball return of a ball screw, and also with an associated assembly method.

BACKGROUND

A rolling-ring screw with balls as rolling bodies is usually referred to as a recirculating ball screw or else a ball screw (KGT). Included among the main constituent parts of a KGT are a threaded spindle and a spindle nut which engages around this spindle. During operation, balls recirculate between these two components. The thread flights of the threaded spindle as well as the spindle nuts are in the form of ball grooves with a suitable profile and are matched in a complementary manner to one another such that together (in the assembled state) they form a ball channel or a ball guide. By contrast to a screw/nut connection, in which the thread flanks slide on one another in a planar manner, in the case of the KGT the recirculating balls in the thread take up the transmission of load between nut and spindle. The planar sliding movement is thus replaced by a rolling (off) movement, this being associated with reduced friction.

In order to obtain a closed recirculation path for the balls, ball diverters are used. These ball diverters have the task of lifting out the balls from the ball guide between spindle nut and threaded spindle at a first location and feeding them back at a second location. The ball return thus constitutes a bypass, which bridges one or more thread flights of the nut/spindle system and thus forms a closed recirculation path for the balls of a KGT. In general, the balls in the spindle nut are lifted radially outwardly out of the ball groove and guided inside or outside the spindle nut in a channel or a tube (diverting channel), before they are inserted again in the ball channel between threaded spindle and spindle nut at the location provided for this purpose.

From a technical perspective, a KGT functions as a screw drive, which can convert a rotational movement into a longitudinal movement, the step-down or step-up ratio being determined by the dimensioning of the threaded spindle and the pitch of the thread.

Ball screws are used in many technical applications, primarily in mechanical engineering and there preferably in machine tools. KGTs are increasingly however also being used as longitudinal drives in sectors where previously hydraulic or pneumatic systems were used, e.g. in presses, injection molding machines and power steering systems. Moreover, KGTs also play an increasing role in electromechanical and electrohydraulic braking systems, where KGTs are used as a replacement for hydraulic brake cylinders or parallel to known braking systems in the case of braking assistance systems.

Ball screws can fundamentally be operated in two modes. If the spindle nut is mounted in a positionally fixed but rotatable manner, the threaded spindle however being mounted in a rotationally fixed but longitudinally displaceable manner, the threaded spindle moves along its longitudinal axis as soon as the nut is driven. In the second case, the threaded spindle is mounted in a positionally fixed but rotatable manner, and the spindle nut is mounted in a rotationally fixed and longitudinally movable manner. In the case of a driven threaded spindle, this leads to a linear movement of the spindle nut along the threaded spindle.

The invention is concerned with improving and simplifying the ball diverter. What is meant by diverter below specifically is the component which is responsible for the lifting out of the channel between threaded spindle and threaded nut and also for the guidance in the diverting channel. This component is demanding from a functionally critical and production perspective for several reasons: In a KGT, usually as many balls are used as it takes to always ensure a uniform transmission of load between threaded spindle and spindle nut over the length of the KGT. At the same time, however, the balls need to have enough play among one another to prevent jamming, in particular in the ball diverter. When the balls are lifted out of the ball channel by the ball diverter, they undergo a complex change in direction successively into various spatial directions. The diverter must therefore be capable of compensating the forces of the balls when they undergo these changes in direction. These are, on the one hand, the forces which are released when the balls are relieved of load (out of the channel between threaded spindle and spindle nut) as well as by the repeated change in direction in the diverting channel itself.

Depending on the drive direction of the KGT, in this case any diverter is used in an alternating manner to lift out from and to introduce into the ball channel, and therefore has to be able to fulfil both functions reliably. Not least, the ball diverter is a substantial source of the operational noise of a KGT.

PRIOR ART

Ball diverters are usually produced by producing a suitable (radial, tangential or axial) bore, though-bore or milled relief at suitable locations in the body of the spindle nut that opens out centrally into a ball groove of the internal thread. Fastened in this opening is a diverting element which is frequently formed in the manner of a tongue or a spade in order to facilitate the lifting of the balls out of the ball channel. After this, the balls are discharged radially outward and guided along the KGT longitudinal axis in the direction of the further diverting device. This takes place either in tubular or trench-like diverting channels, which are disposed on or in the spindle nut wall. A further diverting element then conducts the balls back into the ball channel.

For reasons of economic industrial manufacture and operational reliability and to reduce the assembly outlay, it is evident that as few as possible discrete components should be used for this purpose.

EP 2 221 506 is noted at this juncture only in an exemplary manner for the numerous possibilities of realizing a ball diverter. This document describes a diverting body of plastic that consists of two halves which are to be connected to one another, together form a diverting channel and are held together by means of latching or clamping devices. This diverting channel is realized as an external diverter to be placed on the spindle nut.

WO 2014/184154 describes a ball diverter which is constructed in two parts. Together with a radially external component, a radially internal component forms a channel for the balls, the two components being held in place by a sleeve which surrounds the spindle nut.

A significant factor driving up costs and also a potential source of assembly errors are complex constructions of the ball diverters. A significant simplification is achieved by a ball diverter according to EP 2 514 999. This document describes a single-part or single-piece ball diverter, which can be inserted from the outside tangentially into an opening in the spindle nut and realizes the diverter in a channel disposed parallel to the spindle nut axis.

In this respect, the balls are conducted by the diverter body in a tubular portion, thereby in terms of production allowing the diverter in the form of an injection molded part to be complex.

SUMMARY

It is therefore an object of the present invention to describe a diverter for the ball return that has a diverting channel and two diverters adjoining the ends of the diverting channel, the diverters having a simplified design.

The present invention improves the ball return of a ball screw in comparison with the prior art. In this respect, a ball return comprises a diverting channel (in or on the spindle nut) and two structurally identical diverters. The function of the diverters is the lifting in and lifting out of balls from the ball channel between the spindle nut and the threaded spindle of the ball screw, and to guide them into the diverting channel. The two diverters are configured in one piece. Structurally identical means that said diverters (apart from series variations during the manufacture) have been produced identically, have the same contour and in particular do not have to be manufactured e.g. as mirror-symmetrical parts. Mistakes during the assembly are therefore ruled out.

Each diverter comprises in this respect substantially 2 functional regions or elements (i). A positioning element, which is configured to define the installation position (that is to say the (radial) installation depth, orientation in the spindle nut) of the diverter. "Radial" here refers to being at a right angle to the longitudinal axis L of the ball screw. The positioning element in this respect is any unit which, in the fitted/assembled state, is arranged on the outside of the lateral surface of the spindle nut or terminates flush therewith. This lateral surface preferably interacts with a contour of the spindle nut that is configured as a stop surface or depth delimitation.

(ii). A deflection element with a spade-like lifting-out region and a diverting surface for the balls out of or into the ball channel. The contour of this element is comparable in design terms in the broadest sense to a groove; a depression which runs in a manner which is concavely curved, largely linear, but straight only in portions. As an alternative, said contour can be described as a concavely curved, sinuous ramp which conducts the balls from the ball groove into the diverting channel (or vice versa). The transverse curvature is selected such that although it guides the balls, it reliably does not cause them to jam. The radius of the groove curvature is thus always larger than the ball radius. The radius in cross section does not have to be constant here—the groove can thus be made flatter toward the edge than in the center or have an elliptical cross section. The groove can also change similarly in terms of radius in its longitudinal extent (from the lifting-out region over the diverting surface to the diverting channel). What is important here, in the context of the simplified production, is that the ball diverter according to the present invention does not form a completely closed tube at any location, and thus does not have a tunnel or tunnel portion. This specification applies here for a ball diverter or diverter in the form of an unfitted element which is not fully assembled. In the fitted state, regions, elements and/or surfaces of the spindle nut or of a covering sleeve pushed over onto the spindle nut supplement the tubes, which are not completely closed, to form tunnels or tunnel portions, in order to ensure the reliable guidance of the balls in the technical sense of a ball return.

The directional indications in this description of the deflecting element also apply expediently for application during the reintroduction into the ball channel between spindle nut and threaded spindle on account of the identical function as a lifting-in or lifting-out element.

Depending on the configuration of the KGT (rotational speed, ball mass, diverting angle), the groove is configured such that the noise development of the KGT is kept low, it being possible to attribute said noise development to the balls being relieved of load when they are being lifted out from the ball channel. The spade-like lifting-out region can be configured for this purpose such that it has impact surfaces or regions which can absorb the kinetic energy of the balls during the lifting out or load relieving operation in a flexible manner. This can be brought about by the selection of the material in the same way as by the configuration of the lifting-out region and diverting surface.

The positioning element will thus delimit the radial insertion depth of the diverter, and prevent the rotatability in the assembled state in or on the spindle nut. This ensures that the diverter is provided by means of a defined position and orientation in the spindle nut receptacle and can fulfil its function. In consequence, the diverter is configured such that it can be inserted radially from the outside into the lateral surface of the spindle nut—and not e.g. from the end face of the spindle nut.

The positioning element preferably has a substantially cylindrical or oval basic shape, the height of which is smaller than the thickness at the circumference of the spindle nut at the installation site. The positioning element and also the deflection element will particularly preferably transition into one another seamlessly. Despite the functional differentiation, a single-part/single-piece workpiece is thus obtained.

A further important feature is that all of the surfaces of the diverter that are provided for the guidance of balls are configured as grooves which are not closed and are not tunnel-like. Expressed differently, in the non-fitted state, the diverter according to the invention does not contain any closed tube portions which serve for the guidance of the balls. Although the concavely curved, linear depression, in the form of which the grooves are described as being, can have laterally raised-up walls which support the guidance of the balls, it is not annularly or arcuately closed; it is an open channel. This opening can be characterized in terms of the opening angle $\phi$, which is determined as the angle of the point of intersection of two straight lines which run from the groove edges to the operationally customary position of a ball in the channel, oriented perpendicularly to the movement direction of said ball, the point of intersection being in the center point of the ball (cf. FIG. 11). The free opening angle will feature at least 30°, preferably 90° or more. The upper limit for $\phi$ is 180°. This specification should also apply when the ball is guided on such portions only during specific movement operations.

A diverter according to the invention is preferably formed as an injection molded workpiece from plastic. Depending on the configuration and requirement profile, a type of plastic will be selected which is sufficiently mechanically and thermally stable and is elastic, in order to obtain the required service life. Corresponding engineering plastics and their properties are known.

Two structurally identical diverters together with elements of a ball screw form a ball return. In this respect, a diverting channel can be configured as a trough or trench recessed in the lateral surface of the spindle nut and at each of the ends of which a diverter is arranged. In its simplest embodiment, a diverting channel is a pressed-in or milled-in depression in the spindle nut which is configured to receive and to guide balls. The diverters are inserted from the outside into the lateral surface of the spindle nut and specifically radially, that is to say from the outside in the direction of the center axis of the ball screw or of the central longitudinal axis of the threaded spindle. The diverters are preferably configured such that they can be inserted exclusively radially, that is to say by a linear movement and not by a (additional) rotational and/or pivoting movement. This primarily facilitates the automated assembly. In the embodiment described, the diverting channel and the diverter(s) are closed during the assembly by a sleeve enclosing the spindle nut in a flush manner. The sleeve thus terminates the diverting channel upward or radially to the outside.

As an alternative to a diverting channel configured as a trough recessed in the lateral surface of the spindle nut or as a trench, the ball return can also be realized with a diverting channel, which is configured as a separate component constructed or placed on the lateral surface of the spindle nut. In this case, depending on the configuration, a sleeve can be dispensed with and the fastening of the diverting channel, as disclosed in the prior art, can be achieved by screwing, clamping or latching.

As an alternative, it is also conceivable that the diverting channels themselves are merely inserted and are held by the diverting channel which has been placed thereon.

The method steps and/or assembly steps for assembling a ball return of a ball screw are to be described below. Said assembly comprises the following steps:

Providing two single-piece, structurally identical diverters as described above;

Providing a pre-assembled module composed of at least one spindle nut and a threaded spindle, the spindle nut having two radially inwardly fitted apertures. The contour of said apertures is configured such that it can receive the diverters. The apertures are connected by a ball channel.

Inserting the diverters into the apertures;

Introducing a plurality of balls into the ball screw via the ball channel or one of the diverters;

Securing the ball return by attaching a covering sleeve to the spindle nut.

DETAILED DESCRIPTION

Figure 1:
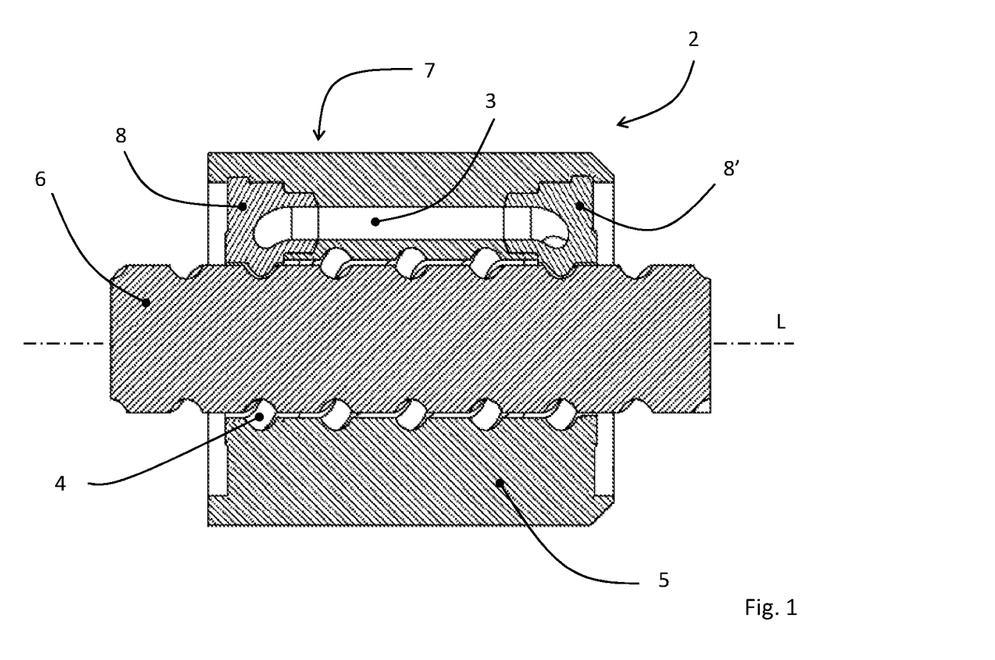
FIG. 1 schematically shows a basic diagram of a KGT according to the prior art.

FIG. 1 shows a KGT 2 in an embodiment according to the prior art. Said embodiment is intended to explain the most important constituent parts of a KGT, as will also be repeatedly used in the present description. What is shown is a KGT 2 in a longitudinal section along the center axis L. A threaded spindle 6 has an external thread adapted to the geometry of the balls of the KGT 2, and also the internal thread of the spindle nut 5, which concentrically surrounds the threaded spindle. This forms a helical ball channel 4. In the case shown, a ball return is formed by a diverting channel 3 disposed in the spindle nut 5. The diverter is effected by two diverters 8, 8' which are inserted in the end faces of the spindle nut 5. The lateral surface 7 of the spindle nut 5 remains free as a result.

Figure 2:
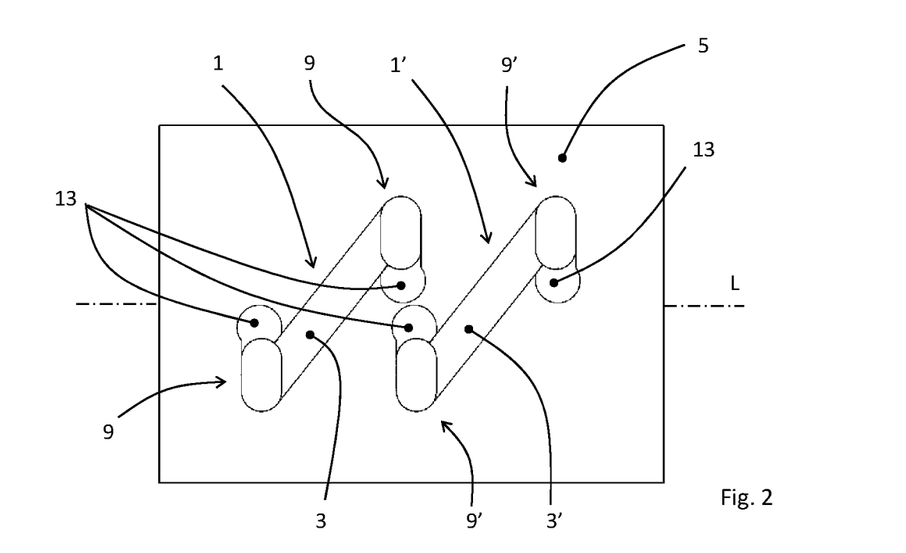
FIG. 2 shows a plan view of a spindle nut with schematically shown cut-outs for diverters and the diverting channel.
Figure 8:
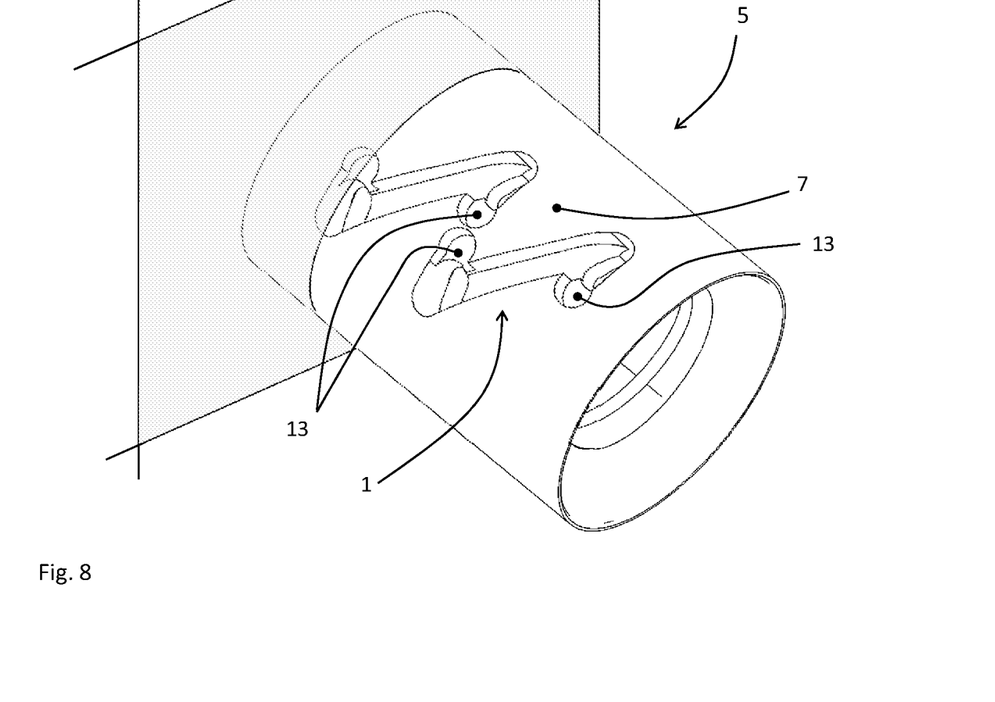
FIG. 8 shows the sectional plane of FIG. 7.

FIG. 2 shows a plan view of a spindle nut 5 with schematically shown cut-outs 9, 9' for diverters and the diverting channel 3, 3'. FIG. 8 shows a perspective variant. It is shown in FIG. 2 that the ball returns 1, 1' here are in the form of depressions, incorporated in the lateral surface 7, for the diverting channel 3, 3', each of which adjoins the prepared depressions 9, 9' for diverters. The radially outwardly open channels or openings are finally closed by a sleeve which is pushed over (said sleeve is not shown here) or local coverings. L in turn denotes the central longitudinal axis.

Figure 3:
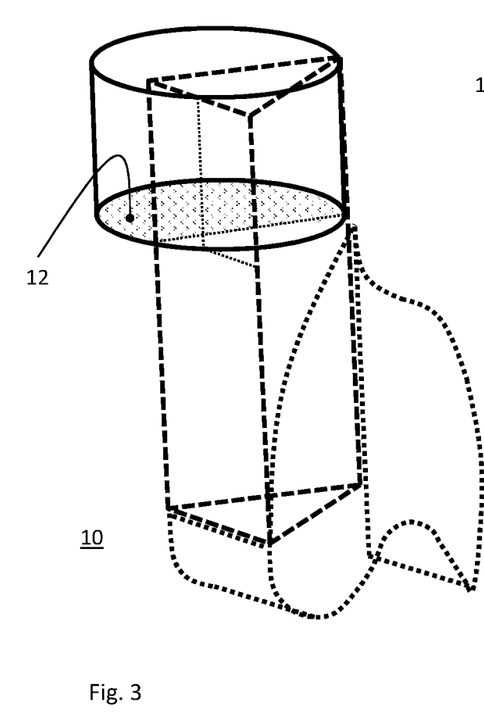
FIG. 3 shows the 3 functional units/modules of a diverter according to the invention.
Figure 4A:
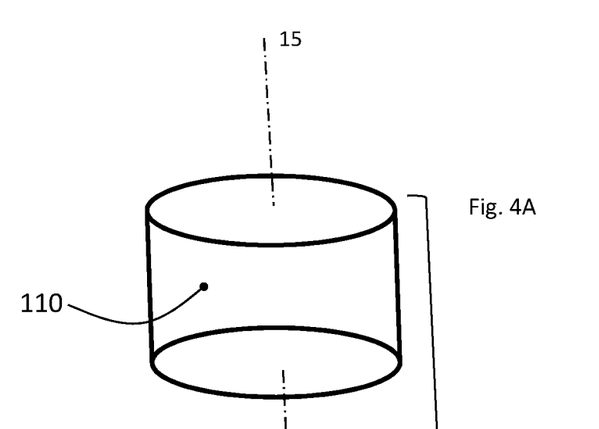
FIG. 4A to FIG. 4C show an exploded view of FIG. 3.

FIG. 3 explains the concept, described in the present invention, of a diverter 10 which is functionally in two parts or can be divided (functionally) into two parts. The examination is intended to be carried out together with FIGS. 4A to 4C, which show an exploded view. The single-piece diverter 10 is indicated as a body, the regions or volume regions of which can be assigned different tasks.

The positioning element 100, arranged "at the top" in the drawing, forms in the fitted state the element at the uppermost position, that is to say on or in the lateral surface of a spindle nut. The installation direction of the diverter 10 is outwardly radial in the direction of the longitudinal axis L of the ball screw. In the case of this first embodiment that is shown, in the case of the positioning element 100, a head part 110 and a connecting piece 120 can also be different. Here, in an idealized manner, the head part 110 can be considered to be a cylinder having a flat bottom side 12, which interacts with a corresponding surface 13 of the spindle nut that acts as a stop or depth delimitation; shown in FIGS. 2 and 8 as part of the cut-out 9, 9'. The formation as a cylindrical body makes it possible to produce the mating contour in the spindle nut 5 by boring or milling in a particularly simple manner. Such a configuration makes it possible to realize a simple and slender diverter even in thick-walled spindle nuts.

Figures 4B, 4C:
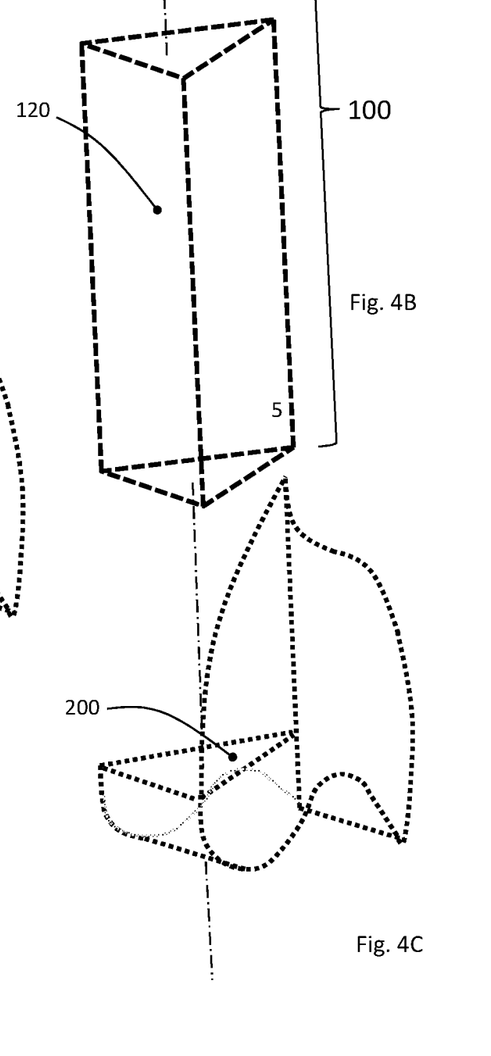
Figure 6:
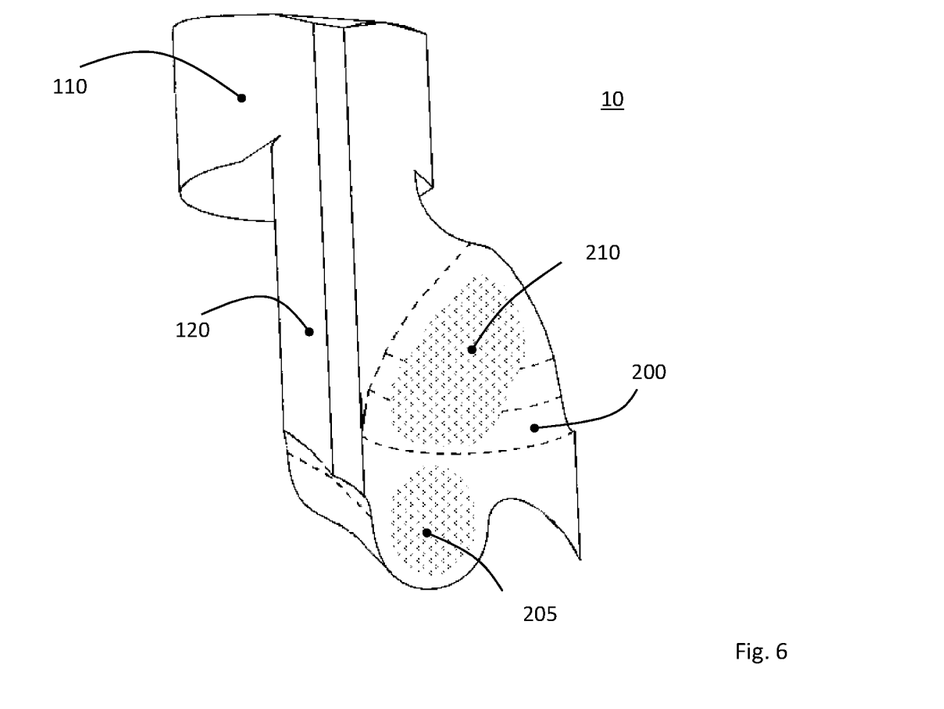
FIG. 6 is a perspective view of the functional surfaces of a diverter.

The deflection element 200 is shown as a further functional element in FIG. 3 and independently in FIG. 4C. Said deflection element has a spade-like lifting-out region 205 and a diverting surface 210 for the balls out of or into a ball channel (FIG. 6). The deflection element 200 engages with its S-shaped contour, illustrated at the bottom in the drawing, into the ball channel. Since FIG. 6 allows a better understanding of the deflection element 200, reference is made to the description of said figure.

The longitudinally extended connecting piece 120 connects the positioning element 100 and the deflection element 200 to one another and ensures security against rotation. A polygonal configuration of the connecting piece ensures that the deflection 10, in particular the deflection element 200, has a defined orientation and is not displaced or rotated during operation by the momentum of the impacting balls which are to be deflected. The selected design makes it possible for the diverter 10 to make do without latching or clamping elements. The intended installation position of the diverter 10 is thus ensured substantially by the positioning element 100, in this embodiment by the head part 110 (depth stop) thereof and the connecting piece 120 (protection against rotation).

Figure 5:
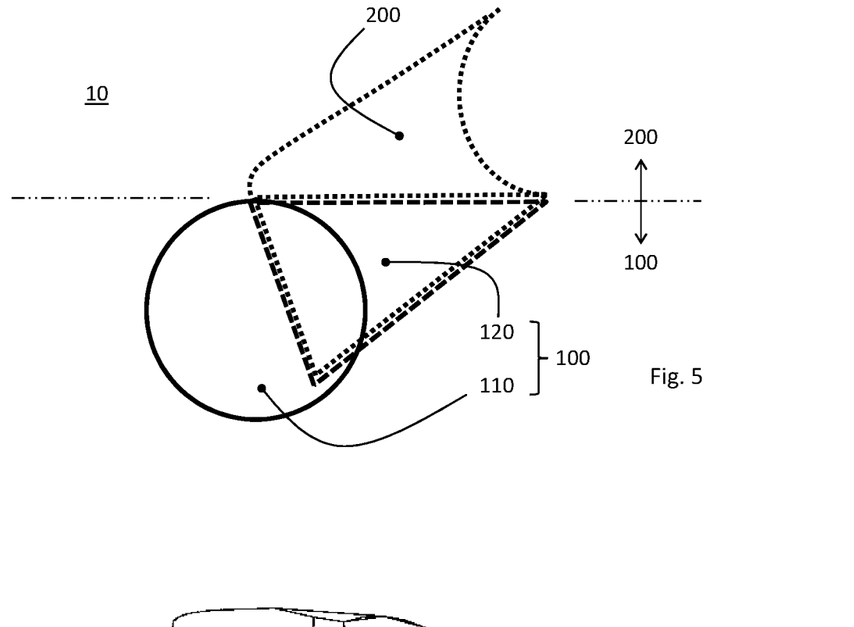
FIG. 5 is a plan view of the functional modules according to the invention.

FIG. 5 shows a view of a diverter 10 "from above", i.e. similar to the plan view in the fitted state of the lateral surface 7 in the spindle nut. The superposition of the above-described functional elements in the diverter 10 can be seen. The same line types have been used as in FIGS. 3 and 4A-4C.

FIG. 6 shows a diverter 10 in a perspective view from the side, in which, during operation, the balls from the ball channel between spindle nut and threaded spindle impact on the deflection element 200. The spade-like lifting-out region 205 dips into the ball channel and forces the balls out of the helical thread raceway initially radially outward (corresponding to "upward" in the figure). The diverting surface 210 then ensures that the balls pass into the diverting channel 3 (FIG. 7) (to the right in the drawing). This diverting channel can run exactly parallel to the spindle longitudinal axis, but can also form an angle therewith, as shown in FIGS. 2 and 8. As a result of the structurally identical configuration of the diverters 10, as already described, from the lifting-out region 205 and diverting surface 210, depending on the operating direction, of course also the functional surfaces which return the balls into the ball channel again.

Figure 7:
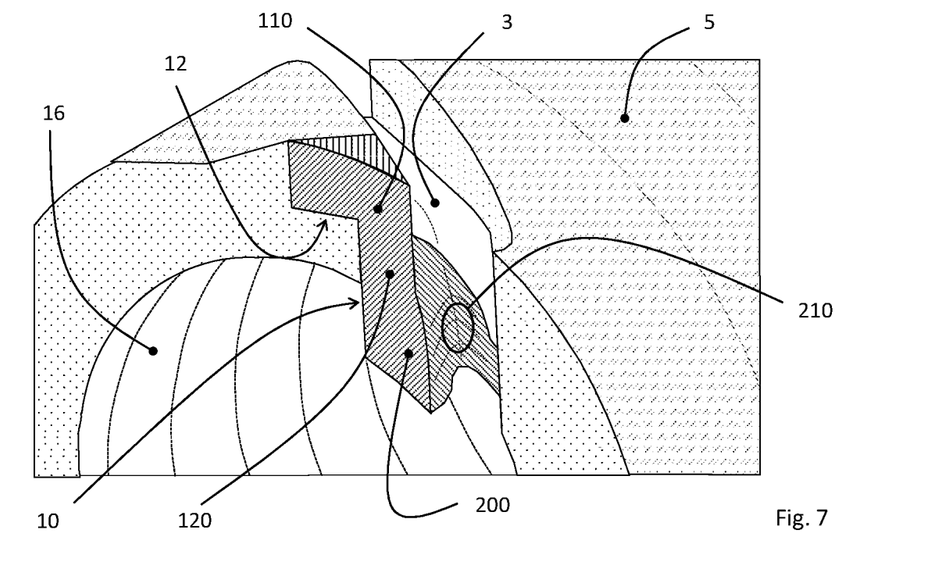
FIG. 7 shows a diverter in the fitted state in a cross section through the ball nut.

FIG. 7 shows a cross section through a spindle nut 5 with a fitted diverter 10 along a cross-sectional plane 14 (FIG. 8). The position/arrangement of the positioning element 100 and deflection element 200 with the diverting surface 210 and the connecting piece 120 is marked. What can be clearly seen is how the diverting surface 210 transitions into the diverting channel 3 and how the positioning element 100 ensures that the position of the diverter 10 in the spindle nut 5 is defined. The threaded spindle is omitted in FIG. 7, indicated schematically are the grooves 16 of the internal thread of the spindle nut 5. The position of the bottom side 12 of the positioning element 100 is marked by an arrow.

Shown in FIG. 8 is a spindle nut 5 with the recesses in the lateral surface 7 that are used for the ball return 1. 14 denotes the cross-sectional plane from FIG. 7.

Figure 9:
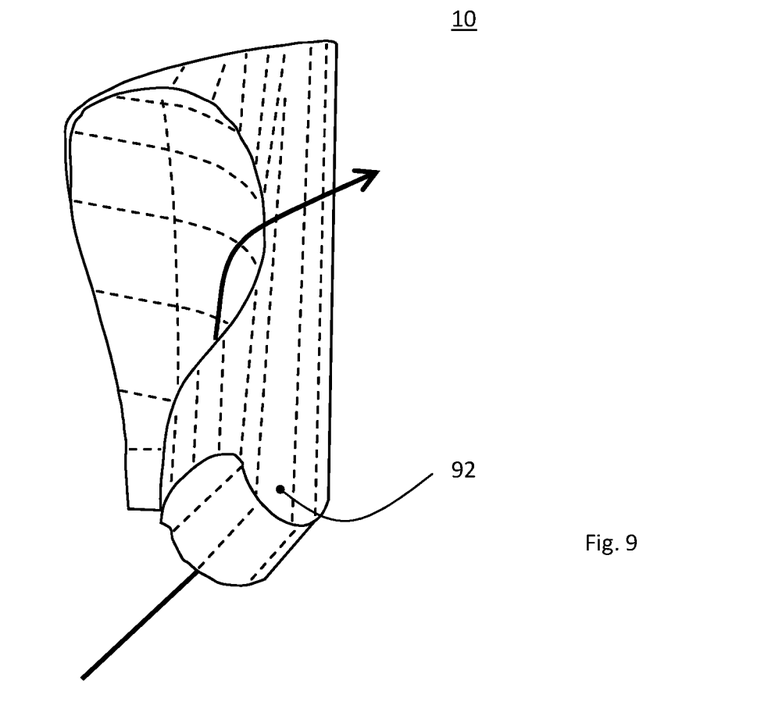
FIGS. 9 and 10 show a second embodiment of a diverter.
Figure 10:
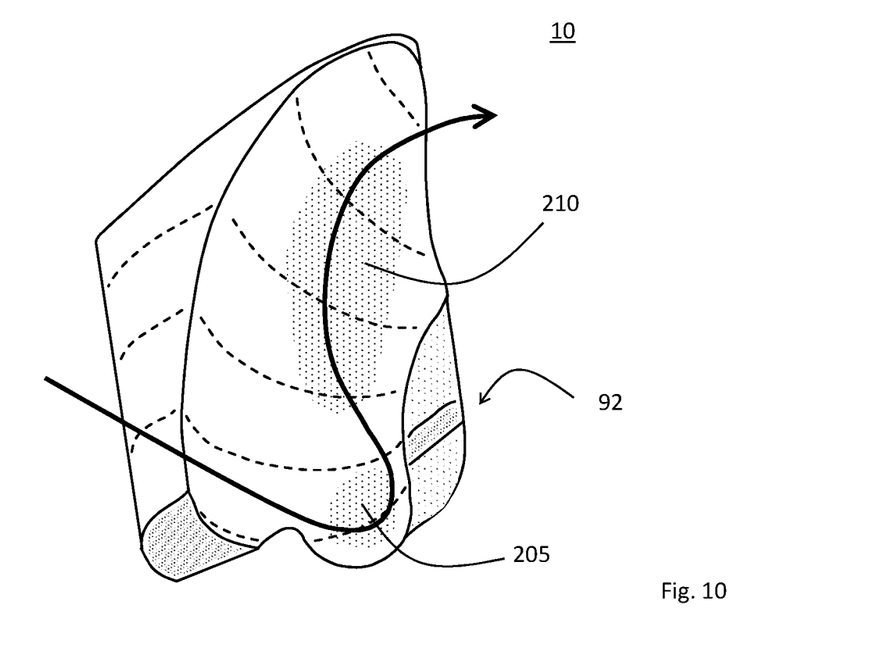

FIGS. 9 and 10 show a second embodiment of a diverter 10 according to the invention in a variety of views. The element 92 with its semi-circular contour denotes the region which engages into the ball groove of the threaded spindle in the fitted state. The solid arrow indicates the path of a ball during the lifting-out operation. FIG. 10 additionally indicates the lifting-out region 205 and the diverting surface 210.

Figure 11:
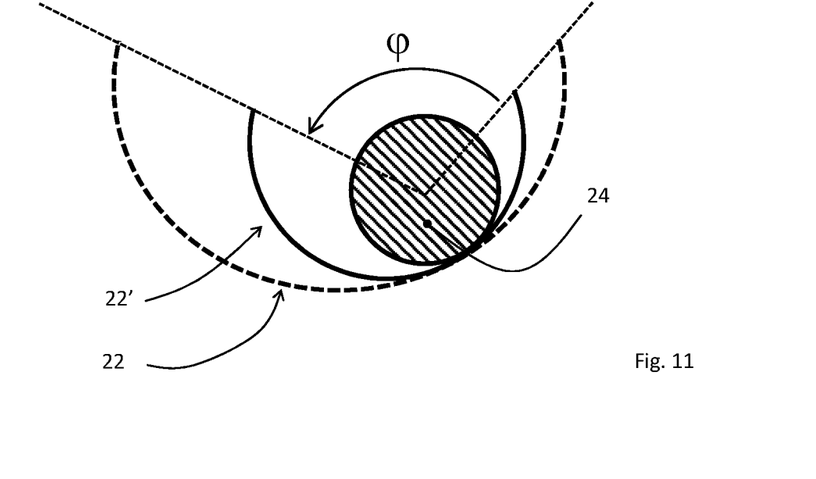
FIG. 11 shows the angular relationship in the case of a groove.

FIG. 11 is an auxiliary drawing, which shows by way of example two variants 22, 22' of a concavely curved, linear depression in cross section, which is what the grooves are described as. The laterally raised-up surfaces are not closed annularly or arcuately; they form an open channel. This opening can be characterized in terms of the measurable opening angle φ with respect to a usual position of a ball 24 in the channel, perpendicular to the direction of movement (here: perpendicularly into or out of the plane of the drawing), proceeding from the center point of the ball. What is meant here by "usual position" is all the operationally conventionally provided positions of the ball in the groove. The free opening angle will feature at least 30°, preferably 90° or more. The two variants 22, 22' prove that, even with different curvatures/groove cross sections, the angle φ can be used for characterization.

Figure 12:
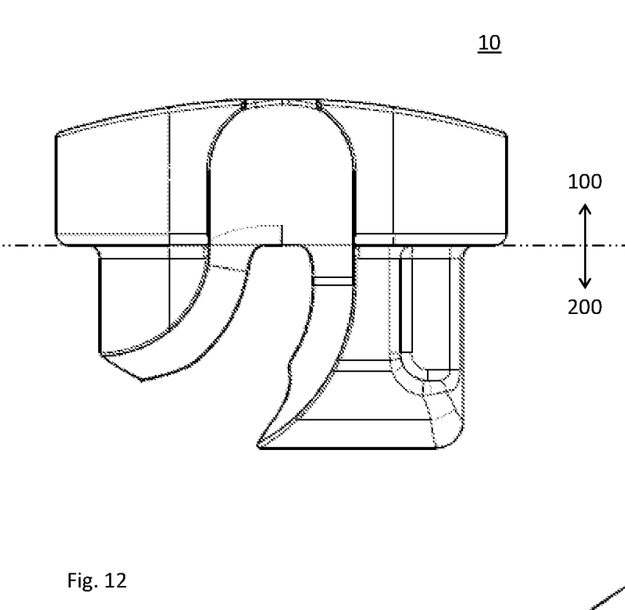
FIGS. 12 and 13 show a third embodiment of the invention in a side view and perspective view.
Figure 13:
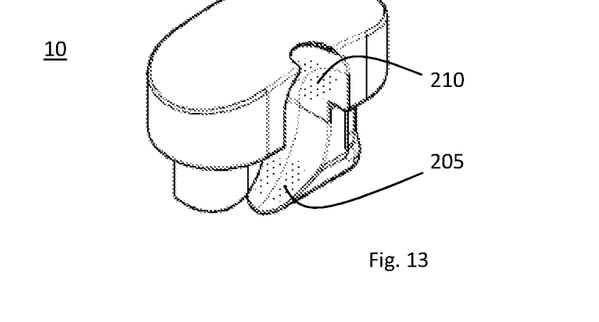

FIGS. 12 and 13 show a third embodiment of a diverter 10 according to the invention in two different views. Here, the positioning element 100 and deflection element 200 can be subdivided roughly by a horizontal line. FIG. 10 in turn shows the lifting-out region 205 and the diverting region 210 in a hatched manner.

In all three exemplary embodiments, the features according to the invention can thus be identified, despite a largely different configuration of the diverter.

The features of the invention disclosed in the preceding description, in the drawings and in the claims may be essential both individually and in any desired, but technically expedient or advantageous combination for implementing the invention.

The invention claimed is:

1. A ball return of a ball screw, the ball return comprising:
a diverting channel and two structurally identical diverters configured for lifting in and lifting out balls from a ball channel between a spindle nut and a threaded spindle of the ball screw, each diverter comprising:
one piece having at least 2 functional regions or elements, including:
(i) a positioning element, configured to define an installation position of the diverter, the positioning element has a substantially oval basic shape, and
(ii) a deflection element with a spade-shaped lifting-out region and a diverting surface for deflecting the balls out of or into the ball channel;
all surfaces of the diverter that are provided for the guidance of balls are configured as open grooves which are not circumferentially closed; and
wherein the positioning element is configured to terminates flush with a lateral surface of the spindle nut, the diverters being configured to be inserted from outside into a lateral surface of the spindle nut such that the positioning elements terminate flush with the lateral surface of the spindle nut, wherein each of the diverting elements is configured to be inserted exclusively radially into the lateral surface at a right angle to a longitudinal axis of the ball screw.

2. The ball return as claimed in claim 1, wherein the positioning element has a height that is smaller than a thickness at a circumference of the spindle nut at an installation site.

3. The ball return as claimed in claim 1, wherein the positioning element transitions seamlessly into the deflection element.

4. The ball return as claimed in claim 1, wherein the diverter is an injection molded plastic workpiece.

5. The ball return as claimed in claim 1, wherein the diverter is configured for use as both an element for introducing and for lifting out balls from the ball channel.

6. The ball return as claimed in claim 1, wherein the open grooves, which are not circumferentially closed, have a free opening angle φ of at least 30° measured from groove edges to an operationally conventional position of one of the balls in the channel, oriented perpendicularly to a direction of movement of the ball.

7. The ball return as claimed in claim 1, wherein the diverting channel is configured as a trough or trench recessed in the lateral surface of the spindle nut.

8. The ball return as claimed in claim 1, wherein the diverting channel and the diverters are closable during assembly by a sleeve enclosing the spindle nut in a flush manner.

9. The ball return as claimed in claim 1, wherein the diverting channel is configured as a separate component constructed or placed on the lateral surface of the spindle nut.

10. A method for assembling a ball return of a ball screw, comprising the following steps:
   providing two single-piece, structurally identical diverters configured for lifting in and lifting out balls from a ball channel between a spindle nut and a threaded spindle of the ball screw, each diverter comprising:
   one piece having at least 2 functional regions or elements, including:
   (i) a positioning element, configured to define an installation position of the diverter, the positioning element has a substantially oval basic shape, and
   (ii) a deflection element with a spade-shaped lifting-out region and a diverting surface for deflecting the balls out of or into the ball channel;
   all surfaces of the diverter that are provided for the guidance of balls are configured as open grooves which are not circumferentially closed; and
   wherein the positioning element is configured to terminates flush with a lateral surface of the spindle nut;
   providing a pre-assembled module including at least one spindle nut and a threaded spindle, the spindle nut having two radially inwardly directed apertures, contours of which are configured to receive the diverters, and a ball channel which also connects one of the apertures;
   inserting the diverters into the apertures exclusively radially at a right angle to a longitudinal axis of the ball screw;
   introducing a plurality of balls into the ball screw via the ball channel or one of the diverters; and
   securing the ball return by attaching a covering sleeve to the spindle nut.

\* \* \* \* \*